Dec. 24, 1957 P. T. HAHN 2,817,503
FOOD MIXER WITH AXIALLY RETRACTABLE BEATERS
Filed Nov. 12, 1954 2 Sheets-Sheet 1
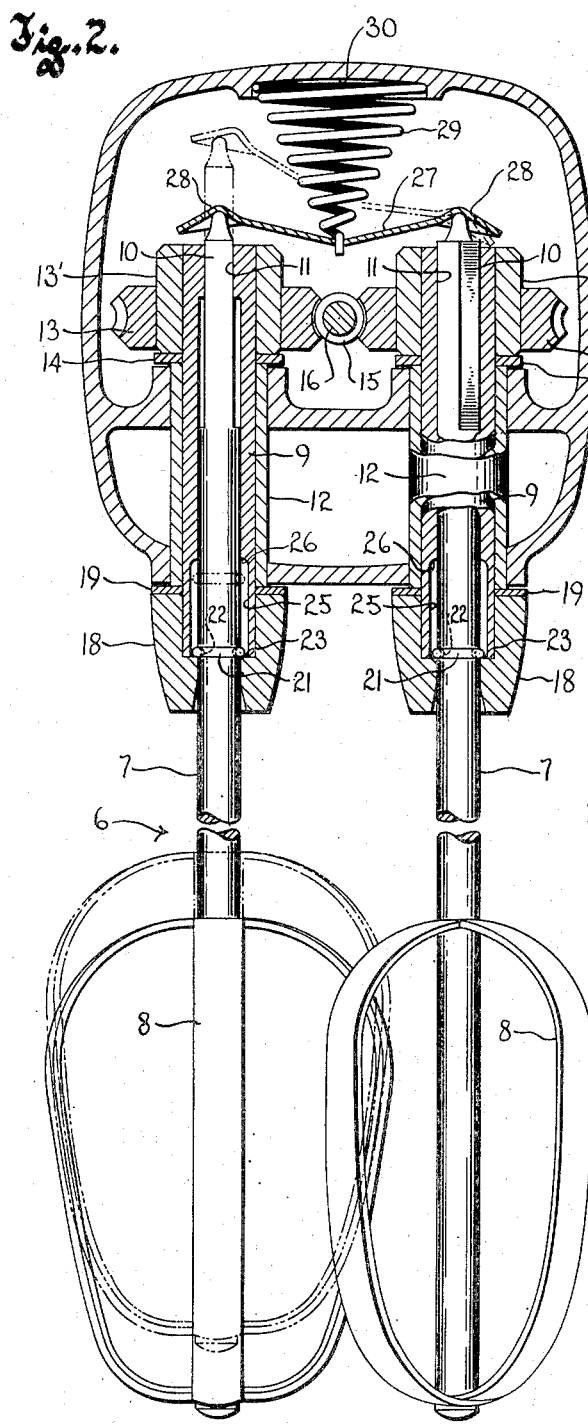
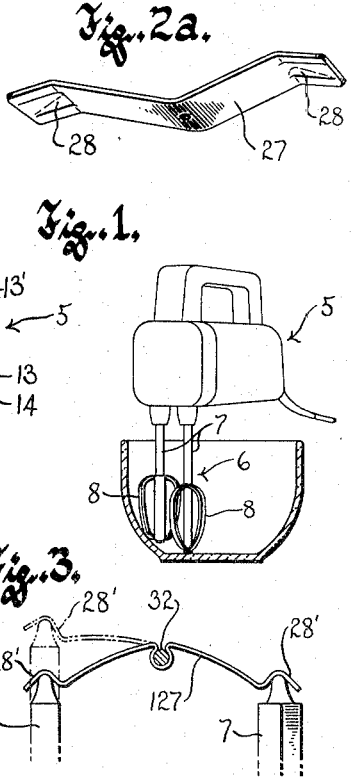
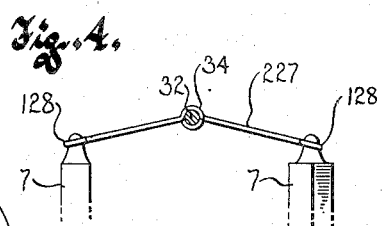
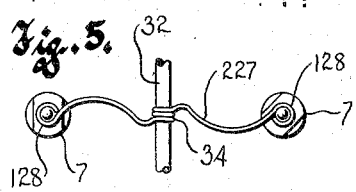
Inventor
Paul T. Hahn Dec. 24, 1957 P. T. HAHN 2,817,503
FOOD MIXER WITH AXIALLY RETRACTABLE BEATERS
Filed Nov. 12, 1954 2 Sheets-Sheet 2
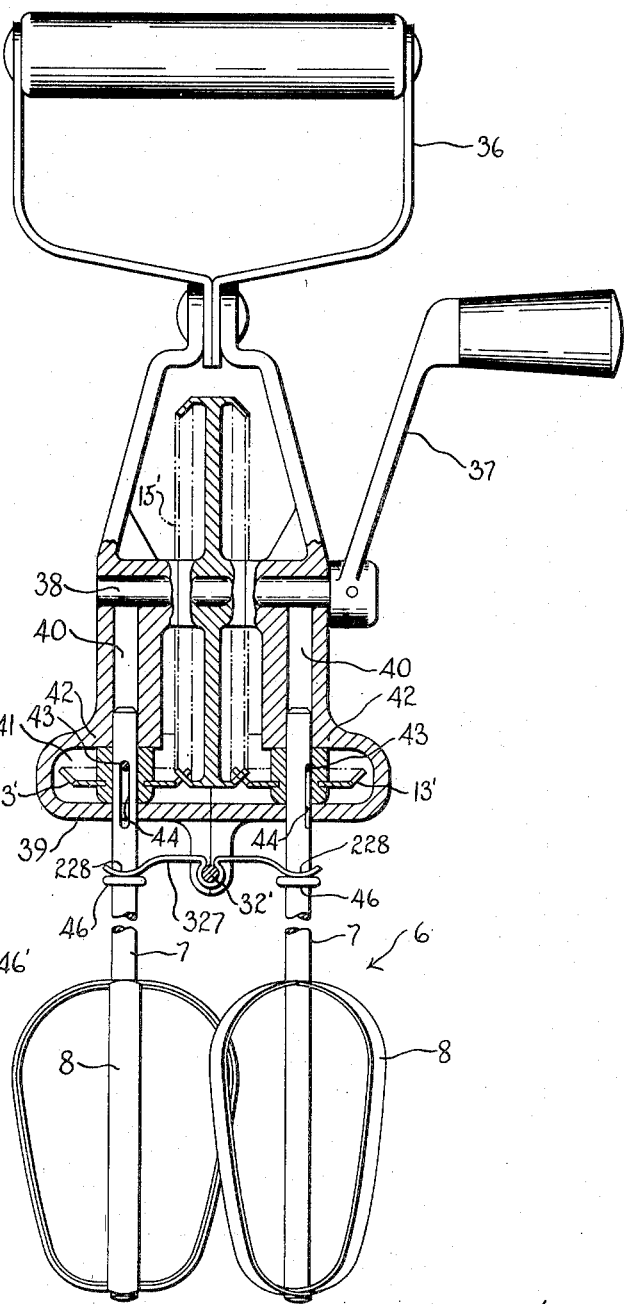
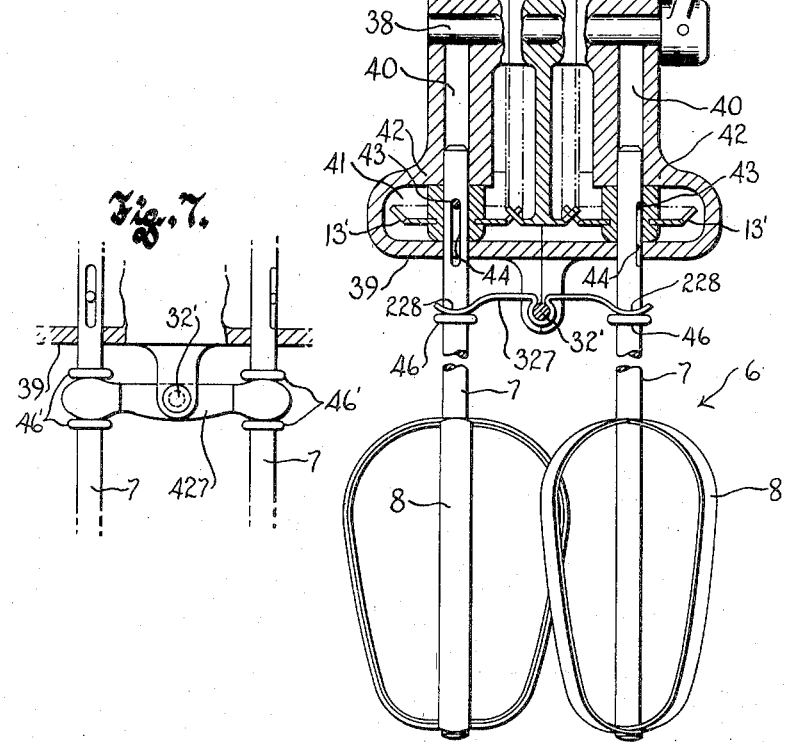
Paul T. Hahn

United States Patent Office 2,817,503
Patented Dec. 24, 1957

2,817,503

FOOD MIXER WITH AXIALLY RETRACTABLE BEATERS

Paul T. Hahn, Milwaukee, Wis., assignor to John Oster Manufacturing Company, Milwaukee, Wis., a corporation of Wisconsin Application November 12, 1954, Serial No. 468,239

3 Claims. (Cl. 259—131)

This invention relates to rotary mixers of the type used for beating and mixing foods and liquids, and refers more particularly to improvements in portable food mixers having axially retractable beaters, of the general type shown and described in the copending application of Alfred W. Madl, Serial No. 366,977, filed July 9, 1953, now Patent No. 2,699,925.

As in the aforesaid copending application, it is the purpose of this invention to provide a rotary food mixer in which the beater blades will closely follow or conform to the curved interior surfaces of a mixing bowl as the mixer is manually manipulated in the bowl. This feature results from the fact that the mixer shafts automatically adjust themselves axially as a consequence of the engagement of their blades with the walls of the bowl.

Axially retractable beaters, therefore, are most advantageously provided on so-called portable type food mixers which are held and manipulated by the operator during use, as distinguished from those mixers that are normally mounted on a pedestal or the like to have their beaters operate in a fixed zone in a mixing bowl, the bowl being supported in a predetermined position with respect to the beater shafts.

One of the main reasons for the growing popularity of the portable type of mixer is that it enables the operator to shift or tilt the beaters about in the mixing bowl at will, thereby enabling the beaters to be moved into all areas of the mixing bowl to facilitate the mixing operation and to dislodge food being mixed from all of the surfaces of the bowl interior. Because the beaters are free to move axially independently of one another, the zone of influence of the beaters can be brought closer to the side wall of the bowl than would otherwise be possible. This desirable result arises from the fact that the beater which is nearest the side wall of the bowl can cam itself upwardly along the upwardly curved surface of the bowl joining the side and bottom walls thereof while the other beater remains in contact with the bottom of the bowl.

The provision of axially displaceable beaters in a portable mixer has another advantage in that it materially improves the "feel" of the mixer. As such a mixer is used, the normal tendency is for the operator to hold it so that its blades are as close to the bottom of the bowl as possible without actually striking the bowl. Contact between the bowl and the blades is usually avoided because it results in an unpleasant rattle caused by the blades intermittently striking the bottom of the bowl at certain points in their orbit. This vibration is transmitted through the mixer to the hand of the operator and normally prompts a raising of the mixer to lift the blades out of contact with the bowl bottom. Thus the tendency is for the user to constantly raise and lower the mixer, his hand hunting between a position in which the beater blades are undesirably high above the bottom of the mixing bowl and a position in which they make rattling contact with it. With axially displaceable beaters the vibration or rattle consequent to engagement of the mixing bowl by the rotating beaters is largely absorbed, so that the mixer has a softer and more pleasant feel.

The present invention has for its principal object the provision of unusually simple, inexpensive and effective means for imparting downward bias to the axially moveable beaters of a food mixer of the character described, adaptable to both manually and mechanically driven mixers.

With the above and other objects in view, which will appear as the description proceeds, this invention resides in the novel construction, combination and arrangement of parts substantially as hereinafter described and more particularly defined by the appended claims, it being understood that such changes in the precise embodiments of the hereindisclosed invention may be made as come within the scope of the claims.

The accompanying drawings illustrate several complete examples of the physical embodiments of the invention constructed according to the best modes so far devised for the practical application of the principles thereof, and in which:

Figure 1 is a perspective view of an electrically operated portable rotary food mixer having axially yieldable beaters, the mixer being depicted in use within a mixing bowl which is shown in section;

Figure 2 is a cross sectional view through the body structure of the mixer shown in Figure 1, and showing one embodiment of the biasing means of this invention;

Figure 2a is a perspective view of the bridging member (per se) through which biasing force is imparted to the beaters in the Figure 2 embodiment of the invention;

Figure 3 is a more or less diagrammatic fragmentary elevational view showing a modified type of bridging member;

Figures 4 and 5 are more or less diagrammatic views showing another embodiment of the invention, Figure 4 being a fragmentary elevational view and Figure 5 being a fragmentary top view;

Figure 6 is an elevational view of a manually driven rotary mixer incorporating another embodiment of the present invention, portions being shown in section; and Figure 7 is a fragmentary view partly in section and partly in side elevation showing another modification of the invention.

Referring now particularly to the accompanying drawings, the numeral 5 designates generally the body structure of a portable type food mixer. As is customary, the mixer is provided with a pair of beaters 6 each of which projects downwardly from the body structure and comprises a shaft 7 having beater blades 8 secured to its lower portion. The shafts 7 are carried by the body structure for rotation on spaced vertical axes and for a substantial degree of axial up and down motion to enable the beaters to assume axially offset positions which closely conform to the curved surfaces on the interior of a mixing bowl as the beaters are moved about in the bowl.

Any suitable bearing means may be employed to mount the beater shafts on the mixer for rotation on vertical axes and for axial up and down sliding motion. In the present case, the upper end portions of the shafts project into the bores of sleeves 9 and have a sliding splined connection therewith afforded by the engagement of a non-circular portion 10 on the upper extremity of each shaft in a correspondingly shaped non-circular hole 11 in its sleeve 9. The sleeves, in turn, are rotatably mounted in elongated bushings 12 fixed in the body structure of the mixer.

The sleeves 9 extend a distance above the upper ends of their bushings 12, and each sleeve has a driven gear 13 fixed to its upper end portion. In the present instance, the gears 13 are relied upon to preclude downward displacement of the sleeves from their bushings. For this purpose, the gears are provided with hubs 13' which rest upon the upper ends of the bushings 12, a thrust washer 14 being interposed therebetween if desired. The lower end portions of the sleeves project downwardly a short distance from the underside of the body structure, and each has a collar 18 secured thereto. A thrust washer 19 interposed between each collar 18 and the adjacent end of the bushing 12 thus precludes upward axial motion of each sleeve 9.

The driven gears 13, of course, mesh with a drive gear 15 positioned between the two driven gears, and it will be understood that in the structure described, the beaters 6 are driven in opposite directions by their respective driven gears 13 through the splined connections between the sleeves to which the driven gears are secured and the upper end portions of the beater shafts.

Since the mixer shown in Figures 1 and 2 and thus far described is of the electric motor driven type, the drive gear 15 preferably comprises a worm fixed on the motor shaft 16 and confined between and meshing with the driven worm gears 13.

A more or less conventional expansion ring 21 on each beater shaft holds the same against accidental displacement from its sleeve 9. Each of the rings 21 is normally partially received in a circumferential groove 22 in its beater shaft, and its outwardly projecting portion is cooperable with an upwardly facing shoulder 23 on the adjacent collar 18 to define the lower limit of axial sliding motion of its shaft. Each expansion ring 21, of course, is adapted to be contracted into its groove by a substantial downward pull on its beater to enable it to clear the bore in the collar through which the beater shaft projects, to thus provide for removal of the beater from the mixer.

Attention is directed to the fact that the expansion rings 21 are received in counterbores 25 in the lower end portions of the sleeves 9, and are engageable with the downwardly facing shoulders 26 provided by the bottoms of the counterbores to define the upward limits of axial sliding motion of their shafts.

Downward bias is applied to the beater shafts in accordance with the principles of this invention by means of a lever-like motion controlling member 27 having downwardly cupped end portions 28 bearing upon the upper ends of the beater shafts. It will be understood, of course, that the beater shafts project upwardly a short distance beyond their driven gears 13 for engagement by the lever-like member 27, and the upper ends of the shafts are rounded to minimize friction between the shafts and the ends of the lever.

The lever-like motion controlling member is medially supported by the body structure by means of a conical compression spring 29. The spring has a base portion seating in a shallow bore 30 in the top wall of the body structure, and has its lower end connected to and bearing upon the medial portion of the lever. Hence, since the lever bridges the upper ends of the shafts, the force of the spring 29 acting upon the lever is applied to both shafts to yieldingly bias them to their downward limits of motion. At the same time, the spring supports the lever for up and down rocking motion, about a fulcrum provided by the upper end of either shaft.

Hence when either beater is moved upwardly it rocks the corresponding end of the lever-like member upwardly, the lever fulcruming about its point of engagement with the other beater shaft, and such rocking motion of the member is yieldingly resisted by the compression spring.

Rocking of the lever-like motion controlling member 27 in an upward direction by one of the beaters thus increases the downward biasing force upon the other beater, thereby inhibiting upward movement of the lower level beater simultaneously with the retracted one. Thus the structure just described not only permits the beaters to accommodate themselves to the contours of a mixing bowl but provides for absorption of the chattering vibration resulting from engagement of one of the blades with the bowl surface.

In the modification illustrated more or less diagrammatically in Figure 3, the lever-like motion controlling member 127 is medially pivotally mounted on a fixed rigid support 32 on the body structure, and the conical compression spring is eliminated. The support 32 may be in the nature of a pin, and it mounts the lever for rocking motion about a fixed axis midway between the beaters and normal to the plane containing their axes.

Downward bias is imparted to the beaters in this case by reason of the fact that the lever-like member 127 is resiliently flexible, preferably comprising a unitary strip of spring material, and is so shaped that its arms are flexed upwardly to some extent even when both beaters are at their normal lower limits of axial reciprocation. As in the Figure 2 embodiment of the invention, the end portions 28' of the lever arms are downwardly concave and bear directly against the rounded tops of the beater shafts. It will be seen that in this embodiment of the invention also, upward retracting movement of either beater shaft increases the downward biasing force which the flexible lever imposes upon the other beater.

The modification illustrated more or less diagrammatically in Figures 4 and 5 differs from that of Figure 3 principally in the configuration of the lever 227, which is made of spring wire rather than flexible strip material as in the Figure 3 version. To provide yielding downward bias upon the lever arms, the medial portion 34 of the elongated member is bent into a plurality of loops forming a coiled torsion spring encircling the pin 32. The end portions 128 of the lever arms are formed into loops which encircle and rest on the substantially frusto-conical upper ends of the beater shafts to transmit the downward bias of the lever to the beaters without interfering with rotation of the latter.

Figure 6 shows the invention applied to a manually driven mixer, to which it is especially well adapted. As is conventional, the mixer may be held and guided by means of a handle 36 fixed on the body structure, and its beaters may be driven by means of a crank handle 37 affixed to a shaft 38 rotatably journaled in the body structure and to which a large drive gear 15' is secured. The beater shafts 7 project through holes in the bottom wall 39 of the mixer and their upper end portions are rotatably and endwise slideably mounted in a pair of spaced apart wells 40 in the body structure opening toward the bottom wall of the mixer. The beater shafts also serve as journals for driven gears 13' with which the shafts have a splined driving connection, and which drivingly mesh with the drive gear 15'. A recess 41 in the body structure accommodates the driven gears and a wall portion 42 spaced above the bottom wall 39 cooperates therewith to restrain the driven gears against axial displacement. The splined connection between each driven gear and its shaft is provided by a diametrical pin 43 in the hub of the driven gear extending through an axially elongated slot 44 in the shaft. Hence, it will be seen that the limits of axial motion of each shaft are defined by the engagement of the pin with the ends of the slot.

The shafts are biased to their lower limits of axial motion by means of a resiliently flexible lever 327 on the order of that illustrated in Figure 3. The lever is formed from resilient strip material, and its medial portion is bent to provide a loop which embraces a pin 32' fixed to the bottom wall of the body structure to mount the lever for rocking motion about a horizontal axis beneath the body structure of the mixer. At their ends the arms of the lever are arcuately curved downwardly as at 228, and bifurcated to embrace the beater shafts and bear upon annular upwardly facing shoulders defined by a circumferential ridge 46 on each beater shaft. The lever arms, of course, are tensioned even when both beaters are at their lower limits of axial motion, so that they at all times exert a downward biasing force upon the two beaters.

The embodiment of the invention which is shown in Figure 7 is also exceptionally well suited for use with manually operated mixers. The beaters may be rotatably and axially movably mounted in a body structure in the same manner as the beaters in the device shown in Figure 6, and similarly the lever 427 in the Figure 7 version is rockably mounted on a pin 32' fixed on the body structure beneath the bottom wall 39 thereof. In this instance, however, the lever is rigid, rather than resiliently flexible, and its end portions are confined between pairs of axially spaced apart circumferential ridges 46' on the beater shafts, so that each end portion of the lever is constrained to move up and down with its associated beater. Because the lever is rigid, the beaters are thereby constrained to move axially in opposite directions, so that an upward force on one beater produces a corresponding downward bias on the other. It will be seen that when the beaters in the Figure 7 embodiment are disposed with their blades laterally opposite one another, they must both be located at substantially a midpoint between their limits of up and down travel, so that either can move down a distance substantially equal to the distance which the other moves up.

From the foregoing description taken together with the accompanying drawings, it will be apparent that this invention provides a rotary food mixer having axially retractable beaters wherein the beaters are biased downwardly by simple and inexpensive means whereby axial movement of either beater to its upper limit of retracting motion imposes a downward bias upon the other beater, thereby inhibiting upward movement of the lower level beater simultaneously with the retracted one while providing for upward movement of each shaft individually.

What I claim as my invention is:

1. In a food mixer: a body structure including a hollow housing having spaced top and bottom walls; an electric motor in the housing; a pair of rotary beaters each comprising a shaft projecting upwardly through the bottom wall of the housing with its upper end disposed inside the housing in spaced relation to the top wall thereof and having a blade on its bottom portion; means on the housing mounting the beater shafts for rotation on spaced vertical axes and for free up and down axial motion between defined limits; means in the housing drivingly connecting the upper end portions of the shafts with the electric motor; and means in the housing for yieldingly imposing a downward axial force on the upper end of each beater shaft to normally yieldingly maintain the same at its lower limit of motion and for imposing additional downward force on either shaft in consequence of upward axial movement of the other shaft to thereby inhibit simultaneous upward movement of the shafts while providing for upward movement of each shaft individually between said defined limits, said means comprising a bridging member adjacent to but spaced beneath the top wall of the housing and having opposite end portions overlying and engaged with the upper ends of the beater shafts, and housing carried means engaged with a medial portion of the bridging member to support the same for up and down motion of its opposite end portions.

2. The food mixer set forth in claim 1 wherein said bridging member comprises a lever medially supported on the housing by yielding biasing means to provide for bodily up and down movement of the lever as well as rocking motion of the lever about an axis medially of its ends.

3. The food mixer set forth in claim 1 wherein said bridging member comprises a lever, and the supporting means therefor comprises a compression spring having one end interconnected with the medial portion of the lever and its other end interconnected with and reacting against the top wall of the housing, so as to exert a downward force on the lever tending to hold both beaters at their lower limits of axial motion.

References Cited in the file of this patent
UNITED STATES PATENTS

| | | |
|---|---|---|
| 882,114 | Jones | Mar. 17, 1908 |
| 924,578 | Pearson | June 8, 1909 |
| 1,242,765 | Brewer | Oct. 9, 1917 |
| 1,712,144 | Hackett | May 7, 1929 |
| 1,956,141 | Vogt | Apr. 24, 1934 |